UNITED STATES PATENT OFFICE.

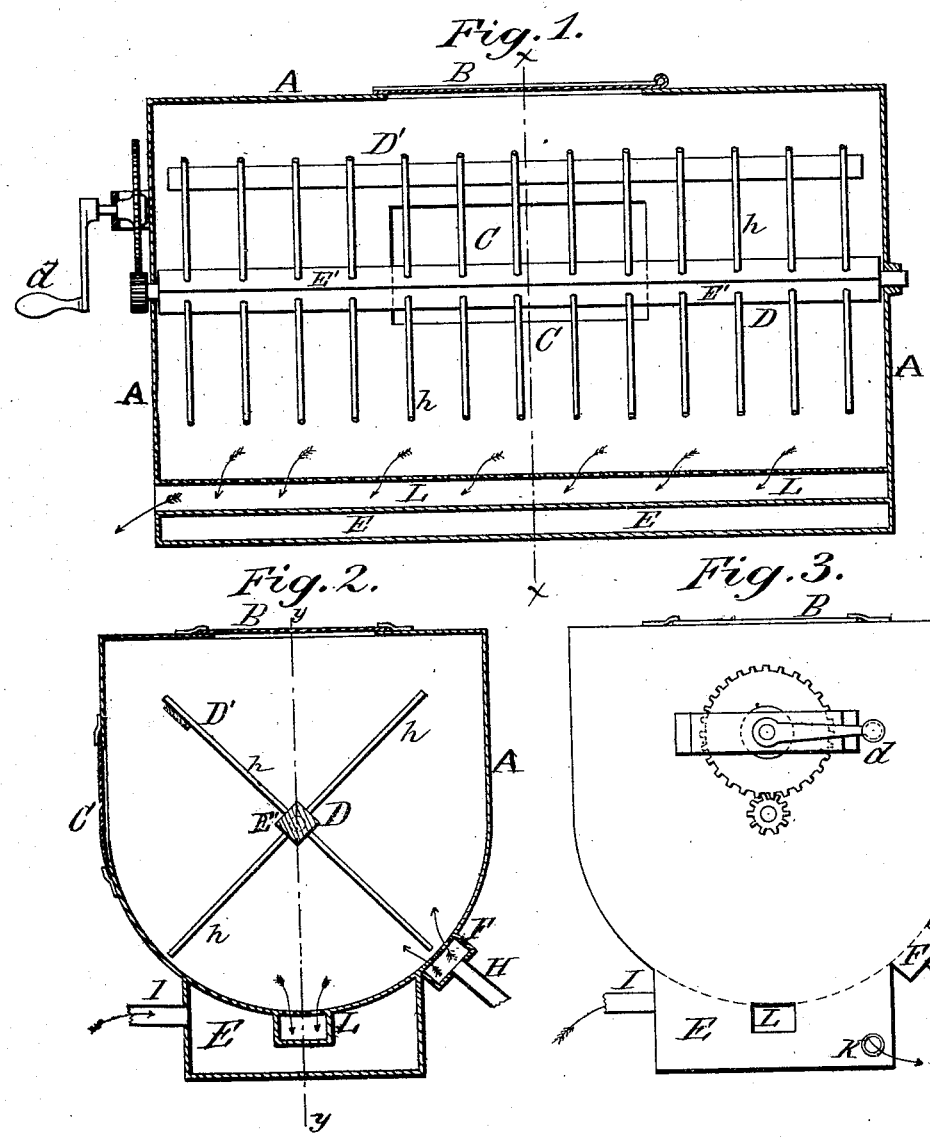

JOHN E. SCHOOLER, OF CHILLICOTHE, MISSOURI, ASSIGNOR OF ONE-HALF HIS RIGHT TO JAMES S. WEAVER, OF SAME PLACE.

IMPROVEMENT IN FEATHER-RENOVATORS.

Specification forming part of Letters Patent No. 145,759, dated December 23, 1873; application filed November 6, 1873.

*To all whom it may concern:*

Be it known that I, JOHN E. SCHOOLER, of Chillicothe, Livingston county, Missouri, have made and invented a new and useful Improvement in Devices for Cleaning Feathers, of which the following is a specification:

The invention relates to a means of cleaning feathers. It consists in providing a drum, the lower side of which is rounded, and to which is attached a steam-chest, which serves as a support for the drum. The feathers are thrown into the drum through a door in its top, and water is injected. A horizontal fan or mixer, which is arranged to revolve within the drum, and is actuated by a crank, is rotated, thus effectually washing the feathers, when the water is permitted to run off, and hot steam being admitted into the chest, and the feathers thus dried, the fan is again rotated, and they are blown out of a door in the side of the drum that is provided, so that it may be opened for that purpose. The object of the invention is to provide a convenient, cheap, and effective means of cleansing feathers.

Figure 1 in the accompanying drawing is a vertical central longitudinal section of a device embodying the elements of the invention through the line $y\ y$. Fig. 2 is a vertical central transverse section of the same through the line $x\ x$. Fig. 3 is an end elevation of the same.

A is the drum, which is, preferably, of sheet metal, constructed with its top or upper side in a horizontal plane, and with its bottom or lower part rounded, substantially as shown in Fig. 1. In its top is the door B, used to inject the feathers, and on one side the door C, out of which, when dried, they are blown. Constructed to turn in bearings in the ends of the drum A, and actuated by the crank $d$, is the fan and mixer D, having two or more series of arms, $h$, arranged upon the shaft $E'$, respectively, as a fan or mixers, so as to agitate and stir the feathers, as well as to blow them, the outer extremities of one series of arms, $h$, being connected by a flat strip, $D'$, which serves as a blower when the shaft $E'$ is rotated. To one side of the drum A, near its lower part, and adjacent to the steam-chest E, is attached the box F, which extends the entire length of the drum, and into which leads the pipe H, through which the water is injected into the box, and thence, through a line of apertures, into the drum A. The steam-chest E is also preferably of sheet metal, its bottom being flat, and sides and ends vertical, the latter being secured at their upper edges to the drum A, the top of the chest being made concave and conformed to the outer surface, or the upper edges of the ends of the chest may be so conformed in case the contiguous parts of the drum are made to serve as a top for the chest. Leading into the chest, near the end of one of its sides, is the pipe I, through which the steam is conducted into the chest, and at the opposite side of the end removed from the pipe last mentioned is the pipe K, through which the steam escapes. In the center of the steam-chest, immediately below the center of the bottom of the drum A, and extending its entire length, is the condenser L, which also serves as a spout to carry off the water, numerous apertures being made in the bottom of the drum directly above it.

The feathers having been placed in the drum A through the door B, the door is closed. Steam and water are now admitted, respectively, into the chest E and pipe H. The lower surface of the drum and the pipe H is thus heated. As the water passes through the pipe, and thence through its apertures over the heated surface of the drum, it becomes warmed. Power is now applied to the crank $d$, rotating the mixer D, and bringing the feathers constantly in contact with the stream of warm water pouring into the drum from pipe H. This operation continues until the feathers are thoroughly cleaned, the foul water passing off in the pipe or condenser L. When the feathers have been properly washed the water is shut off, and the operation of rotating the mixer D continued until they are thoroughly dried, when they may be blown out into any receptacle by opening the door C.

I do not claim broadly the introduction of water into the drum of a feather-renovator, as a device for that purpose is shown in the Letters Patent No. 129,325, for feather renovator, granted Lyman Dimick, July 16, 1872; but What I do claim as my invention, and desire to secure by Letters Patent, is—

The drum A, provided with the steam-chest E, condenser or pipe L, and conduit F, the latter placed near to and warmed by the steam-chest, and connected with the drum by apertures, the water flowing through which passes over and is warmed by the surface of the drum heated by the steam-chest, whereby a constant stream of clean water is fed to the drum, substantially as shown, and for the purpose described.

In testimony that I claim the foregoing improvement in devices for cleaning feathers, as above described, I have hereunto set my hand and seal this 1st day of November, 1873.

JOHN E. SCHOOLER. [L. S.]

Witnesses:
 JOHN T. MOSS,
 GARRISON HARKER.